United States Patent
Bartels et al.

(10) Patent No.: US 11,721,992 B2
(45) Date of Patent: Aug. 8, 2023

(54) SYSTEM AND METHOD FOR SUPPLYING POWER FROM A MULTI-CELL BATTERY TO A SINGLE-CELL POWER MANAGEMENT SYSTEM

(71) Applicant: MOTOROLA SOLUTIONS, INC., Chicago, IL (US)

(72) Inventors: Peter J. Bartels, Loxahatchee, FL (US); Javier Alfaro, Miami, FL (US); Kevin D. Elliott, Lake In The Hills, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 421 days.

(21) Appl. No.: 16/937,377

(22) Filed: Jul. 23, 2020

(65) Prior Publication Data
US 2022/0029435 A1 Jan. 27, 2022

(51) Int. Cl.
*H02J 7/00* (2006.01)

(52) U.S. Cl.
CPC .......... *H02J 7/0047* (2013.01); *H02J 7/0013* (2013.01)

(58) Field of Classification Search
CPC .................................................... H02J 7/0063
See application file for complete search history.

(56) References Cited

U.S. PATENT DOCUMENTS

| | | | | |
|---|---|---|---|---|
| 5,323,100 | A * | 6/1994 | Iketani ...................... | G05F 1/66 320/135 |
| 10,601,981 | B1 * | 3/2020 | Camps .................. | H04M 1/724 |
| 11,086,342 | B1 * | 8/2021 | Kim .......................... | G05F 1/46 |
| 2005/0132108 | A1 * | 6/2005 | Lee .......................... | G06F 1/266 710/72 |
| 2005/0289375 | A1 * | 12/2005 | Ranganathan ............ | G06F 1/26 713/300 |
| 2006/0287007 | A1 * | 12/2006 | Veselic ................ | H04B 1/1607 455/572 |
| 2007/0006004 | A1 * | 1/2007 | Kurts .................... | G06F 1/3215 713/320 |

(Continued)

OTHER PUBLICATIONS

16937377_STIC_Search_Report, 2022.*

*Primary Examiner* — Drew A Dunn
*Assistant Examiner* — Tynese V McDaniel
(74) *Attorney, Agent, or Firm* — Michael Best & Friedrich LLP

(57) ABSTRACT

Systems and methods for supplying power from a multi-cell battery to a single-cell power management integrated circuit. One implementation of the system includes a voltage converter circuit, a control circuit, and a signal buffer circuit. The voltage converter circuit is configured to scale a positive battery terminal voltage signal received from the multi-cell battery to generate a scaled voltage signal. The control circuit is configured to select one of the scaled voltage signal or a cell voltage signal received from the multi-cell battery. The control circuit is also configured to output a high-impedance single-cell power signal including the selected one of the scaled voltage signal or the cell voltage signal. The signal buffer circuit is configured to buffer the high-impedance single-cell power signal to generate a low-impedance single-cell power signal for a voltage sense pin of the single-cell power management integrated circuit.

20 Claims, 5 Drawing Sheets

(56) References Cited

U.S. PATENT DOCUMENTS

| | | | |
|---|---|---|---|
| 2007/0222415 A1* | 9/2007 | Shah | H02J 9/061 320/107 |
| 2008/0146188 A1* | 6/2008 | Herrera | H04B 1/3883 455/343.1 |
| 2011/0078470 A1 | 3/2011 | Wang et al. | |
| 2011/0304299 A1* | 12/2011 | Yang | H02J 7/007182 320/162 |
| 2011/0305343 A1* | 12/2011 | Lee | G06F 3/162 704/500 |
| 2012/0154013 A1* | 6/2012 | Mera | G11C 11/4074 327/333 |
| 2012/0173782 A1* | 7/2012 | Frantz | G06F 9/4418 710/267 |
| 2012/0298494 A1* | 11/2012 | Mahida | G05G 5/06 200/336 |
| 2013/0106341 A1* | 5/2013 | Eaton | H01M 10/441 320/167 |
| 2014/0125127 A1* | 5/2014 | Chou | H02M 3/158 307/23 |
| 2015/0097611 A1* | 4/2015 | Saito | H03F 3/45475 327/323 |
| 2015/0106634 A1* | 4/2015 | Kokai | G06F 1/26 713/300 |
| 2016/0020621 A1* | 1/2016 | Baby | H02J 7/00714 320/128 |
| 2016/0091915 A1* | 3/2016 | Hsu | G05F 3/04 327/540 |
| 2016/0218539 A1* | 7/2016 | Herrmann | H02J 7/00714 |
| 2016/0246341 A1* | 8/2016 | Burrell | G06F 1/3231 |
| 2016/0288619 A1* | 10/2016 | Andrews | B60H 1/00428 |
| 2017/0040952 A1* | 2/2017 | Dong | H03F 3/4565 |
| 2017/0070071 A1* | 3/2017 | Han | G05B 15/02 |
| 2017/0126005 A1* | 5/2017 | Elsayed | G06F 1/305 |
| 2018/0090942 A1* | 3/2018 | Nunez | H02J 7/007 |
| 2018/0192374 A1* | 7/2018 | Jain | H04W 52/0254 |
| 2019/0372363 A1* | 12/2019 | Cutcher | H02J 7/342 |
| 2019/0379418 A1* | 12/2019 | Lee | H04W 4/10 |
| 2020/0073453 A1* | 3/2020 | Kapoor | H02M 3/137 |
| 2020/0127467 A1* | 4/2020 | Li | H02J 7/0013 |
| 2020/0134416 A1* | 4/2020 | Niggemeyer | G06V 10/95 |
| 2020/0144839 A1* | 5/2020 | De Vos | H02J 7/35 |
| 2020/0313442 A1* | 10/2020 | Shih | H02J 7/02 |
| 2021/0013715 A1* | 1/2021 | Lv | G06F 1/32 |
| 2021/0096398 A1* | 4/2021 | Hekmat | H01M 10/425 |
| 2021/0167612 A1* | 6/2021 | Lee | H02J 7/0018 |
| 2021/0296708 A1 | 9/2021 | Alfaro et al. | |

\* cited by examiner

SYSTEM AND METHOD FOR SUPPLYING POWER FROM A MULTI-CELL BATTERY TO A SINGLE-CELL POWER MANAGEMENT SYSTEM

BACKGROUND OF THE INVENTION

Many battery-operated communication devices are designed to operate in a range of voltage from 6.0 volts to 10 volts, which is ubiquitously known as a 2S battery (i.e., a multi-cell battery). However, most commercial, off-the-shelf PMICs (power management integrated circuits) are designed to operate in a range of voltage from 2.5 volts to 5.5 volts, which is ubiquitously known as a 1S battery (i.e., a single-cell battery). In addition, PMICs generally cannot operate with constant voltage power supply batteries as PMICs' built-in battery management functions cannot determine real-time energy delivery capabilities of the power supply batteries due to the constant voltage. Thus, there is a need to make single-cell PMICs compatible with regulated and unregulated multi-cell batteries.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those implementations.

Figure 1A:
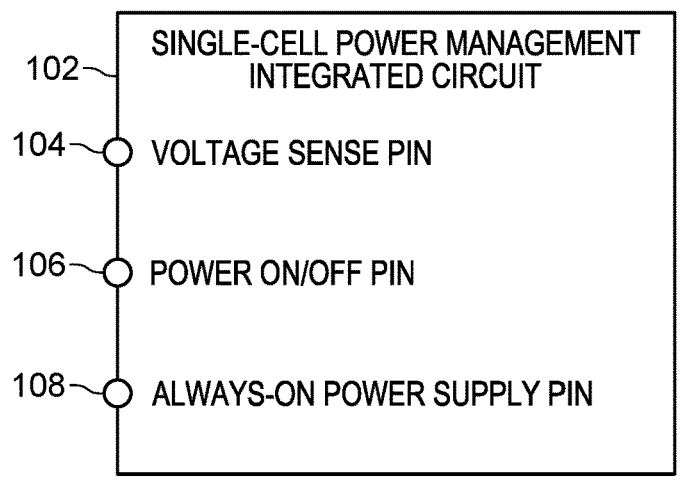
FIG. 1A is a pinout diagram of an example of a single-cell power management integrated circuit, in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The system and method components have been represented where appropriate by conventional symbols in the drawings, showing only those specific details that are pertinent to understanding the implementations of the present disclosure so as not to obscure the disclosure with details that will be readily apparent to those of ordinary skill in the art having the benefit of the description herein.

DETAILED DESCRIPTION OF THE INVENTION

As noted above, many battery-operated communication devices are designed to operate with a 2S battery. PMICs (power management integrated circuits) designed to operate in the voltage range of a multi-cell battery (known as multi-S PMICs) exist but are physically large, expensive, and designed for higher currents than needed by most battery-operated communication devices. In addition, multi-S PMICs require additional protection circuitry for routing of lower voltages in battery-operated communication devices. On the other hand, PMICs designed to operate in the voltage range of a single-cell battery (known as 1S PMICs) are physically smaller, do not require additional protection circuitry, and have a vast ecosystem with a generally strong supply chain. Thus, it is desirable to operate a 1S PMIC (an example of a "single-cell power management integrated circuit") with a 2S battery (an example of a "multi-cell battery").

Also, as noted above, PMICs generally cannot operate directly with constant voltage power supply batteries (known as power control unit [PCU] batteries) as their built-in batter management functions cannot determine real-time energy delivery capabilities of power supply batteries due to the constant voltage. PMICs generally can operate directly with unregulated power supply batteries (known as legacy batteries). However, it is desirable for battery-operated communication devices to be compatible with both PCU batteries and legacy batteries.

Among other things, the implementations presented herein enable supplying power from a multi-cell battery to a single-cell power management integrated circuit by detecting the type of multi-cell battery being used and by lowering the output voltage and Thevenin impedance of the multi-cell battery. Using such implementations, a 1S PMIC is able to function with a PCU battery or a legacy battery.

The present disclosure provides systems for supplying power from a multi-cell battery to a single-cell power management integrated circuit. One implementation of the system includes a first power terminal, a second power terminal, a voltage converter circuit, a control circuit, a signal buffer circuit, and a third power terminal. The first power terminal receives a positive battery terminal voltage signal from the multi-cell battery. The second power terminal receives a cell voltage signal from the multi-cell battery. The voltage converter circuit is configured to scale the positive battery terminal voltage signal to generate a scaled voltage signal. The control circuit is configured to select one of the scaled voltage signal or the cell voltage signal based on a voltage at the second power terminal. The control circuit is also configured to output a high-impedance single-cell power signal including the selected one of the scaled voltage signal or the cell voltage signal. The signal buffer circuit is configured to buffer the high-impedance single-cell power signal to generate a low-impedance single-cell power signal. The third power terminal sends the low-impedance single-cell power signal to a voltage sense pin of the single-cell power management integrated circuit.

The present disclosure also provides methods for supplying power from a multi-cell battery to a single-cell power management integrated circuit. In one implementation, the method includes receiving a positive battery terminal voltage signal from the multi-cell battery at a first power terminal. The method also includes receiving a cell voltage signal from the multi-cell battery at a second power terminal. The method further includes scaling the positive battery terminal voltage signal with a voltage converter circuit to generate a scaled voltage signal. The method also includes selecting, with a control circuit, one of the scaled voltage signal or the cell voltage signal based on a voltage at the second power terminal. The method further includes outputting, with the control circuit, a high-impedance single-cell power signal including the selected one of the scaled voltage signal or the cell voltage signal. The method also includes buffering the high-impedance single-cell power signal with a signal buffer circuit to generate a low-impedance single-cell power signal. The method further includes sending the low-impedance single-cell power signal to a voltage sense pin of the single-cell power management integrated circuit from a third power terminal.

For ease of description, some or all of the example systems presented herein are illustrated with a single exemplar of each of its component parts. Some examples may not describe or illustrate all components of the systems. Other example implementations may include more or fewer of each of the illustrated components, may combine some components, or may include additional or alternative components.

FIG. 1A is a pinout diagram of an example of a single-cell power management integrated circuit 102 for a battery-operated communication device (for example, a mobile phone, a communication radio, and the like). The single-cell power management integrated circuit 102 illustrated in FIG. 1 includes a voltage sense pin 104, a power on/off pin 106, and an always-on power supply pin 108. One skilled in the art would understand that the single-cell power management integrated circuit 102 may include more pins than the ones illustrated in FIG. 1A. For brevity, other pins are not illustrated or described.

The single-cell power management integrated circuit 102 is configured to operate in a range of voltage from 2.5 volts to 5.5 volts, which, as noted above, is ubiquitously known as a 1S (or "single-cell") battery. The single-cell power management integrated circuit 102 is configured to perform battery management functions (for example, DC to DC conversions, battery charging, voltage scaling, power sequencing, and the like). The single-cell power management integrated circuit 102 performs various battery management functions based on the real-time energy delivery capability of a battery. The single-cell power management integrated circuit 102 uses a power signal received from a battery to determine the real-time energy delivery capability of the battery. In some implementations, the single-cell power management integrated circuit 102 also uses the power signal received from the battery to power the components within the single-cell power management integrated circuit 102 that require power when the battery-operated communication device is switched on. The power on/off pin 106 is configured to receive an on-switch control signal which is used to determine whether the battery-operated communication device is switched on or off. The always-on power supply pin 108 is configured to receive a supply power which is used to operate various components within the single-cell power management integrated circuit 102 that require power even when the battery-operated communication device is switched off. For example, a real-time clock within the single-cell power management integrated circuit 102 is always operating even if the battery-operated communication device is switched off.

Figure 1B:
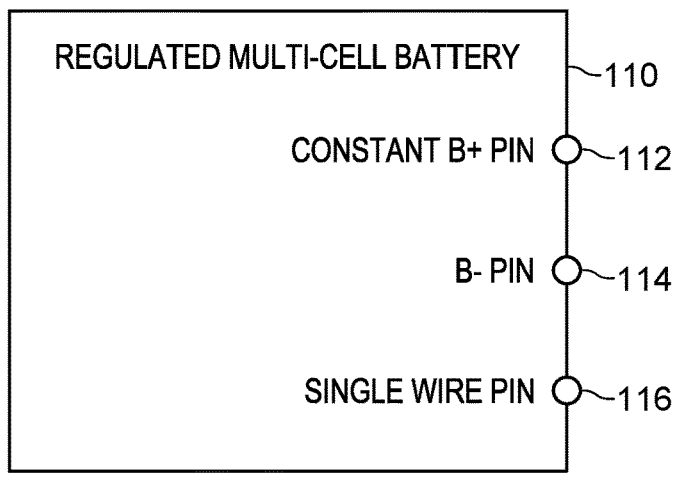
FIG. 1B is a pinout diagram of an example of a regulated multi-cell battery, in accordance with some implementations.
Figure 1C:
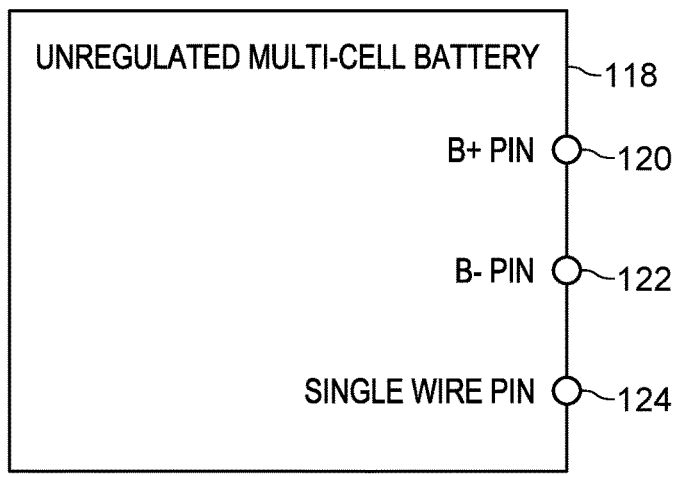
FIG. 1C is a pinout diagram of an example of an unregulated multi-cell battery, in accordance with some implementations.

FIG. 1B is a pinout diagram of an example of a regulated multi-cell battery 110 including a constant B+ pin 112, a B− pin 114, and a single wire pin 116. FIG. 1C is a pinout diagram of an example of an unregulated multi-cell battery 118 including a B+ pin 120, a B− pin 122, and a single wire pin 124. The regulated multi-cell battery 110 illustrated in FIG. 1B and the unregulated multi-cell battery 118 illustrated in FIG. 1C are two examples of a "multi-cell battery." The regulated multi-cell battery 110 and the unregulated multi-cell battery 118 are configured to supply power stored within a plurality of internal battery cells to operate electronic components within a battery-operated communication device. One skilled in the art would understand that the regulated multi-cell battery 110 and the unregulated multi-cell battery 118 may include more pins than the ones illustrated in FIGS. 1B and 1C. For brevity, other pins are not illustrated or described. In some implementations, the unregulated multi-cell battery 118 does not include the single wire pin 124.

As noted above, a single-cell (i.e., 1S) battery supplies a range of voltage from 2.5 volts to 5.5 volts. Being multi-cell, the regulated multi-cell battery 110 and the unregulated multi-cell battery 118 each supply a range of voltage higher than the range of voltage of supplied by a 1S battery. For example, the regulated multi-cell battery 110 may be a 3S (or higher) battery that supplies a static output voltage such as 7.4 volts. As a further example, the unregulated multi-cell battery 118 may be a 2S battery that supplies an output voltage within a range from 6 volts to 10 volts. As a further example, the unregulated multi-cell battery 118 may be a 3S battery that supplies an output voltage within a range from 9 volts to 12.6 volts.

The regulated multi-cell battery 110 uses a voltage regulator to provide a constant output voltage on the constant B+ pin 112, independent of output current. The constant output voltage provided on the constant B+ pin 112 is one example of a "positive battery terminal voltage signal." The regulated multi-cell battery 110 also generates a cell voltage signal that represents the raw cell voltage of the regulated multi-cell battery 110. For example, in FIG. 1B, the regulated multi-cell battery 110 provides the cell voltage signal on single wire pin 116. Single wire pin 116 is multiplexed to provide a plurality of different data and power signals. Alternatively, or in addition, the regulated multi-cell battery 110 provides the cell voltage signal on a separate dedicated pin (not shown). In some implementations, the regulated multi-cell battery 110 scales the cell voltage signal down to the voltage range of a 1S battery. In alternate implementations, the cell voltage signal is not scaled.

The unregulated multi-cell battery 118 provides an output voltage on B+ pin 120 that varies based on, for example, output current. The output voltage provided on B+ pin 120 is another example of a "positive battery terminal voltage signal." The output voltage provided on B+ pin 120 is similar to the cell voltage signal in that it also represents the raw cell voltage of the unregulated multi-cell battery 118. Unlike the regulated multi-cell battery 110, the unregulated multi-cell battery 118 does not provide a separate cell voltage signal. However, in some implementations, the unregulated multi-cell battery 118 provides a predetermined voltage level on the single wire pin 124 that, as described below in more detail, can be used to detect battery type.

As noted above, the single-cell power management integrated circuit 102 is configured to operate within the voltage range of a 1S battery (i.e., between 2.5 volts and 5.5 volts). Thus, the positive battery terminal voltage signals generated by the regulated multi-cell battery 110 and the unregulated multi-cell battery 118 cannot be provided directly to the voltage sense pin 104 because the positive battery terminal voltage signals have voltage levels higher than 5.5 volts. Also, as noted above, the single-cell power management integrated circuit 102 uses a power signal received at the voltage sense pin 104 to determine the real-time energy delivery capabilities of a battery. Thus, the positive battery terminal voltage signal generated by the regulated multi-cell battery 110 should not be provided to the voltage sense pin 104 because the positive battery terminal voltage signal generated by the regulated multi-cell battery 110 has a constant voltage.

Figure 2:
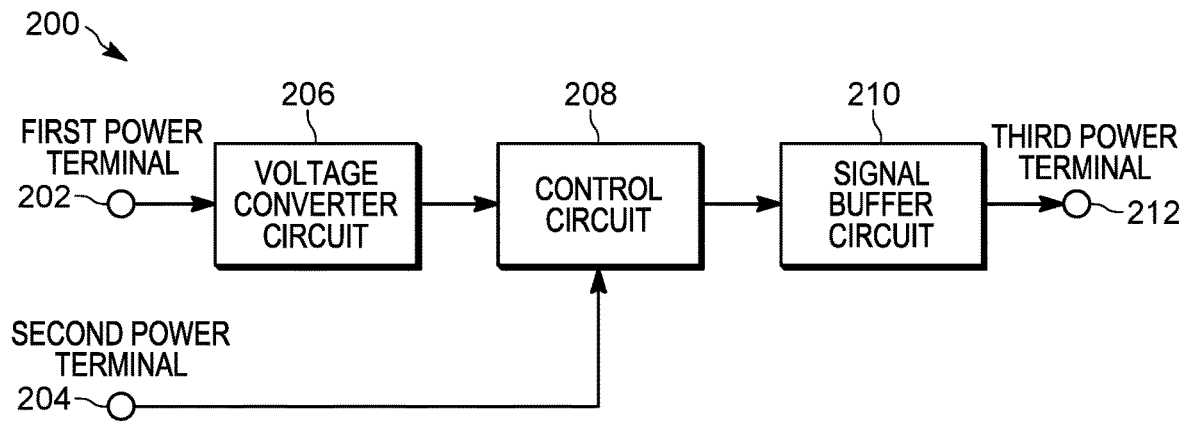
FIG. 2 is a block diagram of an example of a system for supplying power from a multi-cell battery to a single-cell power management integrated circuit, in accordance with some implementations.

FIG. 2 is a block diagram of an example of a system 200 for supplying power from a multi-cell battery to the single-cell power management integrated circuit 102. Among other things, the system 200 provides a power signal to the voltage sense pin 104 of the single-cell power management integrated circuit 102. The power signal provided by the system 200 (an example of a "low-impedance single-cell power signal") is within the voltage range of a 1S battery and represents the real-time energy delivery capability of the multi-cell battery. The system 200 illustrated in FIG. 2 includes a first power terminal 202, a second power terminal 204, a voltage converter circuit 206, a control circuit 208, a signal buffer circuit 210, and a third power terminal 212. In some implementations, the system 200 includes fewer or additional components in different configurations from the one illustrated in FIG. 2.

The first power terminal 202 receives a positive battery terminal voltage signal from a multi-cell battery. When the regulated multi-cell battery 110 is being used, the first power terminal 202 may be coupled to, for example, constant B+ pin 112. When the unregulated multi-cell battery 118 is being used, the first power terminal 202 may be coupled to, for example, B+ pin 120. The second power terminal 204 receives a cell voltage signal from a multi-cell battery. When the regulated multi-cell battery 110 is being used, the second power terminal 204 is coupled to, for example, single wire pin 116. When using a different regulated multi-cell battery, the second power terminal 204 may be coupled to a separate dedicated pin that provides the cell voltage signal. As noted above, the unregulated multi-cell battery 118 does not provide a cell voltage signal. Thus, when the unregulated multi-cell battery 118 is being used, the second power terminal 204 may not be coupled to any pin of the unregulated multi-cell battery 118, and thus the second power terminal 204 does not receive the cell voltage signal. In some implementations, the second power terminal 204 is open-circuit biased to a predetermined voltage level. For example, the second power terminal 204 may be coupled to a ground terminal such that the voltage level at the second power terminal 204 is set to approximately zero volts when the cell voltage signal is not received. As a further example, the second power terminal 204 may be coupled to a reference voltage terminal such that the voltage level at the second power terminal 204 is set to a non-zero voltage value when the cell voltage signal is not received. In some implementations, when the unregulated multi-cell battery 118 is being used, the second power terminal 204 is coupled to the single wire pin 124 of the unregulated multi-cell battery 118. In such implementations, the second power terminal 204 may receive a predetermined voltage level from the single wire pin 124 that is distinct from the cell voltage signal.

The voltage converter circuit 206 is coupled to the first power terminal 202 to receive the positive battery terminal voltage signal therefrom. As noted above, the voltage of positive battery terminal voltage signal is higher than voltage range which the single-cell power management integrated circuit 102 is configured to operate in. Thus, the voltage converter circuit 206 is configured to scale the positive battery terminal voltage signal to generate a scaled voltage signal having a voltage level that is within the voltage range of the single-cell power management integrated circuit 102. For example, the voltage level of the scaled voltage signal is within the voltage range of a 1S battery (i.e., between 2.5 volts and 5.5 volts). In some implementations, the voltage converter circuit 206 includes a voltage divider to scale the positive battery terminal voltage signal.

The control circuit 208 is coupled to the voltage converter circuit 206 and receives the scaled voltage signal from the voltage converter circuit 206. The control circuit 208 is also coupled to the second power terminal 204. The control circuit 208 receives the cell voltage signal from the second power terminal 204 when the regulated multi-cell battery 110 is being used. The control circuit 208 is configured to detect whether the regulated multi-cell battery 110 or the unregulated multi-cell battery 118 is being used. The control circuit 208 is further configured to output the scaled voltage signal when the unregulated multi-cell battery 118 is being used and output the cell voltage signal when the regulated multi-cell battery 110 is being used.

The voltage level present at the second power terminal 204 varies based on whether or not the cell voltage signal is present at the second power terminal 204. As noted above, the cell voltage signal is present at the second power terminal 204 when the regulated multi-cell battery 110 is being used. Thus, the voltage at the second power terminal 204 is within a predetermined voltage range when the regulated multi-cell battery 110 is being used. For example, the voltage at the second power terminal 204 may be within the voltage range of a 1S battery (i.e., between 2.5 volts and 5.5 volts) when the regulated multi-cell battery 110 is being used. As noted above, the cell voltage signal is not present at the second power terminal 204 when the unregulated multi-cell battery 118 is being used. Thus, the voltage at the second power terminal 204 is outside the predetermined voltage range when the unregulated multi-cell battery 118 is being used. For example, the voltage at the second power terminal 204 may be approximately zero volts when the unregulated multi-cell battery 118 is being used. As also noted above, a predetermined voltage level that is distinct from the cell voltage signal may be present at the second power terminal 204 when the unregulated multi-cell battery 118 is being used. Thus, the voltage at the second power terminal 204 may be at the predetermined voltage level when the unregulated multi-cell battery 118 is being used.

The control circuit 208 detects whether the regulated multi-cell battery 110 or the unregulated multi-cell battery 118 is being used based on a detected voltage level at the second power terminal 204. For example, the control circuit 208 determines that the regulated multi-cell battery 110 is being used when the detected voltage level at the second power terminal 204 is within the predetermined voltage range. Alternatively, the control circuit 208 determines that the unregulated multi-cell battery 118 is being used when the detect voltage level at the second power terminal 204 is outside the predetermined voltage range. The control circuit 208 selects the cell voltage signal when the control circuit 208 determines that the regulated multi-cell battery 110 is being used. Alternatively, the control circuit 208 selects the scaled voltage signal when the control circuit 208 determines that the unregulated multi-cell battery 118 is being used. Thus, the control circuit 208 selects one of the scaled voltage or the cell voltage signal based on the voltage at the second power terminal 204.

The control circuit 208 is also configured to output a high-impedance single-cell power signal to the signal buffer circuit 210. The high-impedance single-cell power signal includes either the scaled voltage signal or the cell voltage signal. For example, the control circuit 208 outputs the scaled voltage signal when the unregulated multi-cell battery 118 is being used. Alternatively, the control circuit 208 outputs the cell voltage signal when the regulated multi-cell battery 110 is being used.

The signal buffer circuit 210 is configured to buffer the high-impedance single-cell power signal received from the control circuit 208 and generate a low-impedance single-cell power signal. In some implementations, the signal buffer circuit 210 includes an operational amplifier. For example, the signal buffer circuit 210 may include a unity-gain operation amplifier operating as a voltage follower. In some implementations, the signal buffer circuit 210 includes an emitter follower.

The third power terminal 212 is coupled to the signal buffer circuit 210 and receives the low-impedance single-cell power signal from the signal buffer circuit 210. The third power terminal 212 is coupled to the voltage sense pin 104 of the single-cell power management integrated circuit 102 for sending the low-impedance single-cell power signal thereto.

Figure 3:
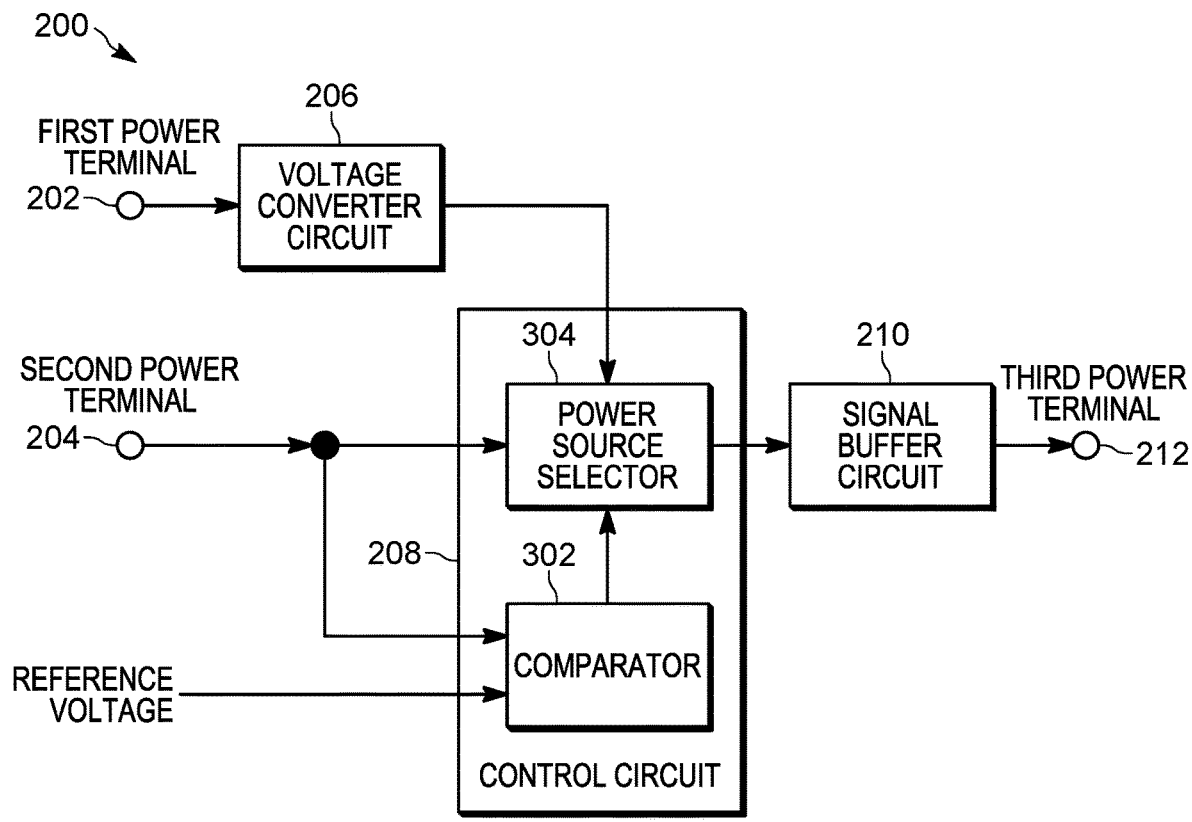
FIG. 3 is a block diagram of a control circuit including a comparator and a power source selector, in accordance with some implementations.

FIG. 3 is a block diagram of an example of processing hardware and operation for the control circuit 208. The control circuit 208 illustrated in FIG. 3 includes a comparator 302 and a power source selector 304. For ease of description, FIG. 3 includes both functions (for example, the comparator 302), which may be implemented in hardware and software, and hardware components of the control circuit 208. In some implementations, all (or a portion) of the functions of the control circuit 208 described herein are implemented by an electronic processor (for example, using software stored in a memory), hardware, or a combination of both.

As noted above, the control circuit 208 selects the scaled voltage signal or the cell voltage signal based on whether the voltage at the second power terminal 204 is within or outside of a predetermined voltage range of the cell voltage signal. The comparator 302 determines whether the voltage at the second power terminal 204 is within or outside of a predetermined voltage range of the cell voltage signal by comparing the voltage at the second power terminal 204 to a reference voltage (with or without hysteresis). In some implementations, the reference voltage is set to a voltage value outside of the predetermined voltage range of the cell voltage signal. Further, the reference voltage is set based on the voltage level present at the second power terminal 204 when the cell voltage signal is not applied. For example, a 1-volt reference voltage may be set when the predetermined voltage range is between 2.5 volts and 5.5 volts and the second power terminal 204 is open-circuit biased to zero volts. In this implementation, the comparator 302 selects the scaled voltage signal when the voltage at the second power terminal 204 is less than or equal to the 1-volt reference voltage. Alternatively, the comparator 302 selects the cell voltage signal when the voltage at the second power terminal 204 is greater than the 1-volt reference voltage. As a further example, a 6-volt reference voltage may be set when the predetermined voltage range is between 2.5 volts and 5.5 volts and the second power terminal 204 is open-circuit biased to 6.5 volts. In this implementation, the comparator 302 selects the scaled voltage signal when the voltage at the second power terminal 204 is greater than or equal to the 6-volt reference voltage. Alternatively, the comparator 302 selects the cell voltage signal when the voltage at the second power terminal 204 is less than the 6-volt reference voltage.

The comparator 302 outputs a signal to the power source selector 304 indicating whether the voltage of the second power terminal 204 is greater than or less than the reference voltage. The signal also indicates whether the scaled voltage signal or the cell voltage signal is selected. In some implementations, the comparator 302 outputs a different signal based on whether the voltage at the second power terminal 204 is greater than or less than the reference voltage. For example, the comparator 302 may output a first voltage signal when the voltage at the second power terminal 204 is greater than the reference voltage, and a second voltage signal when the voltage at the second power terminal 204 is less than or equal to the reference voltage. In alternate implementations, the comparator 302 only outputs a signal when the voltage at the second power terminal 204 is greater than the reference voltage. In other words, the comparator 302 does not output a signal when the voltage at the second power terminal 204 is less than or equal to the reference voltage.

Based on the signal received from the comparator 302, the power source selector 304 selectively outputs the scaled voltage signal or the cell voltage signal. For example, the power source selector 304 connects the output of the voltage converter circuit 206 to the signal buffer circuit 210 when the voltage at the second power terminal 204 is less than or equal to the reference voltage. Further, the power source selector 304 connects the second power terminal 204 to the signal buffer circuit 210 when the voltage at the second power terminal 204 is greater than the reference voltage. In some implementations, the power source selector 304 includes a pair of PMOS and NMOS transistors. In other implementations, the power source selector 304 includes a dual-input single-output power source selector switch.

Figure 4:
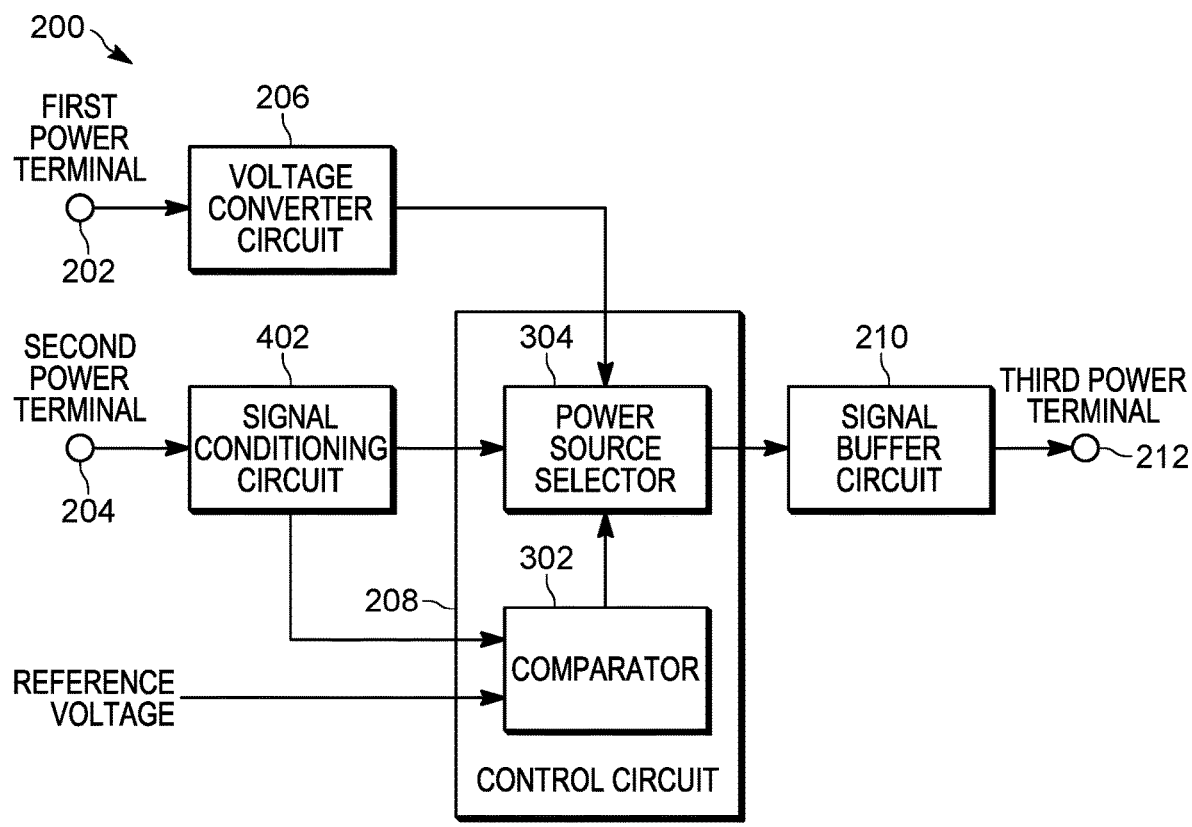
FIG. 4 is a block diagram of the system of FIG. 3 including a signal conditioning circuit, in accordance with some implementations.

As noted above, in some implementations, the cell voltage signal is not scaled internally by the regulated multi-cell battery 110. Thus, as illustrated in FIG. 4, in some implementations, the system 200 further includes a signal conditioning circuit 402. The signal conditioning circuit 402 is configured to scale the voltage at the second power terminal 204 by a predetermined scaling factor before the comparator 302 compares the voltage at the second power terminal 204 to the reference voltage. The predetermined scaling factor may be set, for example, to lower the voltage of the cell voltage signal down to a voltage within operating voltage range of the comparator 302. For example, the signal conditioning circuit 402 may lower the voltage of the cell voltage signal down to the voltage range of a 1S battery (i.e., 2.5 volts to 5.5 volts). In some implementations, the signal conditioning circuit 402 is also configured to lower the impedance of the cell voltage signal.

The voltage converter circuit 206, the control circuit 208, and the signal buffer circuit 210 may not need to be enabled when a battery-operated communication device in which the system 200 is implemented is switched off. Thus, in some implementations, the system 200 receives a device power control signal that indicates whether the battery-operated communication device is switched on or off. Further, the voltage converter circuit 206, the control circuit 208, and the signal buffer circuit 210 are enabled responsive to the device power control signal. For example, the voltage converter circuit 206, the control circuit 208, and the signal buffer circuit 210 may not receive supply power to operate their internal components until a device power control is received indicating that the battery-operated communication device has been switched on. In this manner, the voltage converter circuit 206, the control circuit 208, and the signal buffer circuit 210 are enabled when the battery-operated communication device is switched on. In some implementations, the system 200 receives the device power control signal from a component within the battery-operated communication device (for example, a rotary switch, a latched momentary button, and the like). In other implementations, the system 200 receives the device power control signal from an external source (for example, a remote server, a different communication device, and the like).

Figure 5:
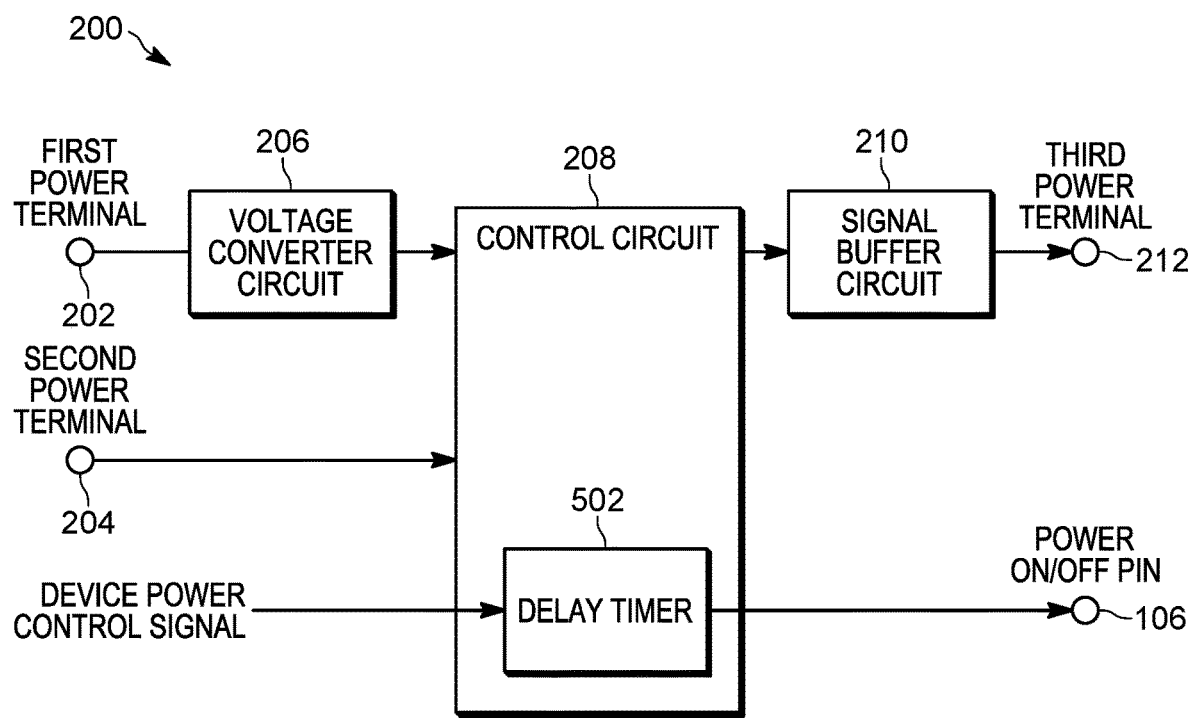
FIG. 5 is a block diagram of a control circuit including a delay timer, in accordance with some implementations.

As noted above, the power on/off pin 106 of the single-cell power management integrated circuit 102 is configured to receive an on-switch control signal which is used to determine when the battery-operated communication device is switched on. However, upon being enabled, it takes some time for the components within the system 200 to power-up and stabilize. For example, it can take up to 5 to 20 milliseconds for the components within the system 200 to stabilize after being enabled. Thus, as illustrated in FIG. 5, in some implementations, the control circuit 208 includes a delay timer 502 that generates an on-switch control signal for power on/off pin 106 of the single-cell power management integrated circuit 102 a predetermined period of time after the control circuit 208 is enabled by the device power control signal. For example, the delay timer 502 may generate the on-switch control signal approximately 10 milliseconds after receiving the device power control signal indicating that the battery-operated communication device has been switched on.

Figure 6:
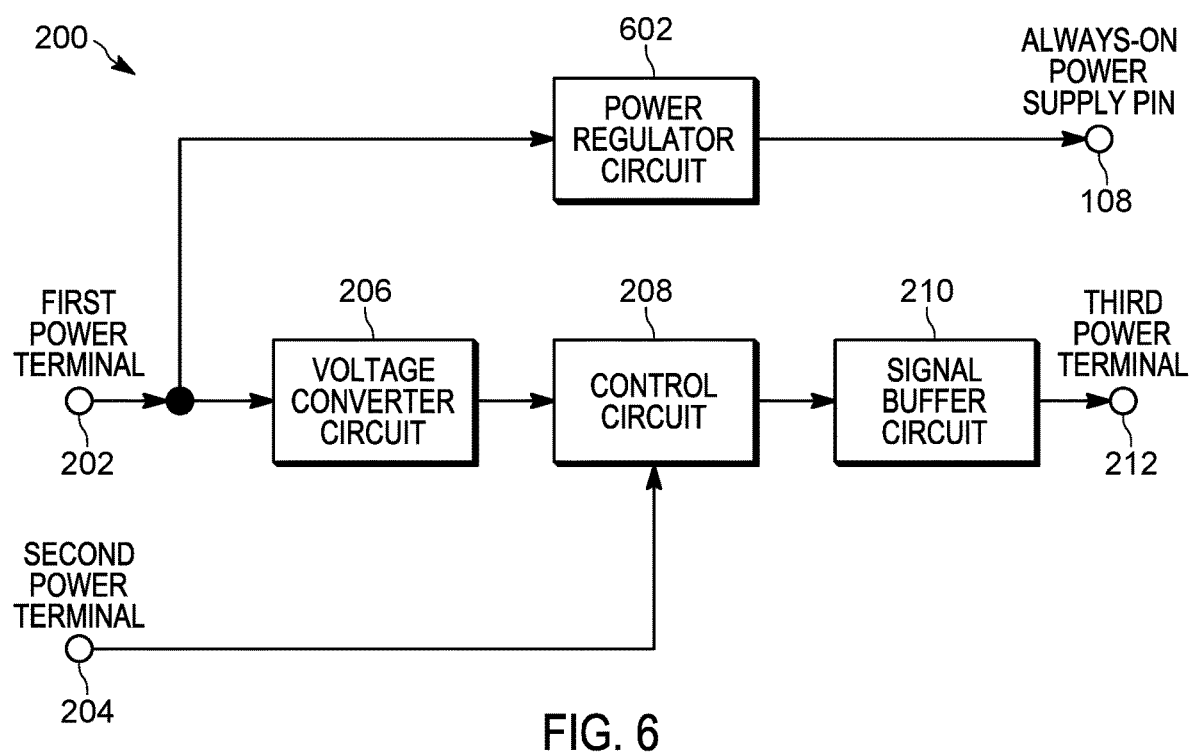
FIG. 6 is a block diagram of the system of FIG. 2 including a power regulator circuit, in accordance with some implementations.

As noted above, the always-on power supply pin 108 of the single-cell power management integrated circuit 102 is configured to receive a supply power which is used to operate various components within the single-cell power management integrated circuit 102 that require power even when the battery-operated communication device is switched off. Thus, as illustrated in FIG. 6, in some implementations, the system 200 further includes a power regulator circuit 602 that generates a low-current, low-power supply signal for one or more always-on power domains in the single-cell power management integrated circuit 102 from the positive battery terminal voltage signal. The output of the power regulator circuit 602 is coupled, for example, to the always-on power supply pin 108 of the single-cell power management integrated circuit 102 as illustrated in FIG. 6.

Figure 7:
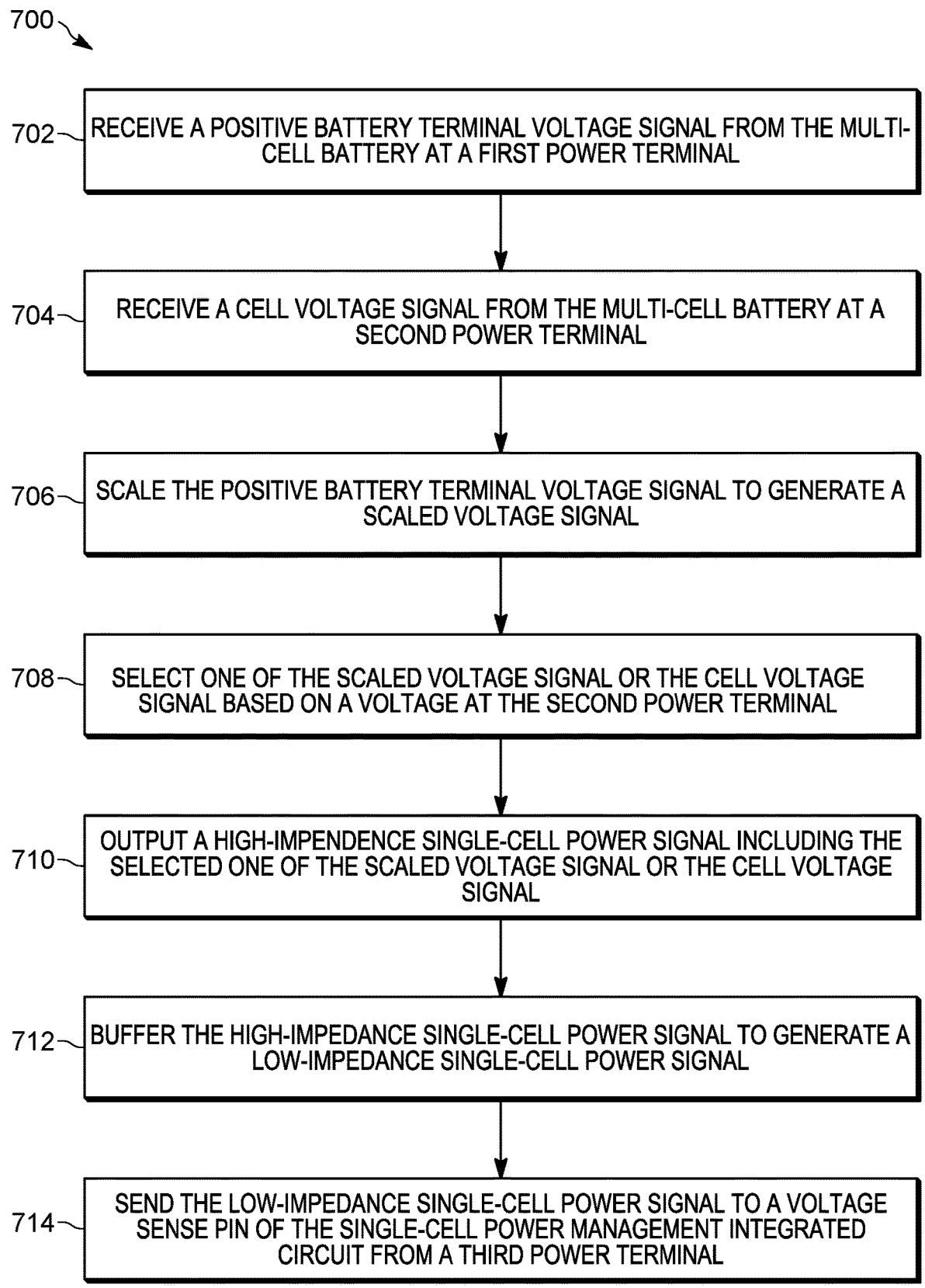
FIG. 7 is a flow diagram of an example of a method for supplying power from a multi-cell battery to a single-cell power management integrated circuit, in accordance with some implementations.

FIG. 7 is a flow diagram of an example of a method 700 for supplying power from a multi-cell battery to the single-cell power management integrated circuit 102. At block 702, a positive battery terminal voltage signal is received from the multi-cell battery at the first power terminal 202. For example, the first power terminal 202 is coupled to the constant B+ pin 112 of the regulated multi-cell battery 110 or to the B+ pin 120 of the unregulated multi-cell battery 118. At block 704, a cell voltage signal is received from the multi-cell battery at the second power terminal 204. For example, the second power terminal 204 is coupled to the single wire pin 116 of the regulated multi-cell battery 110.

At block 706, the voltage converter circuit 206 scales the positive battery terminal voltage signal to generate a scaled voltage signal. For example, the voltage converter circuit 206 may scale a voltage in the range of a 3S battery to a voltage in the range of a 1S battery. At block 708, the control circuit 208 selects one of the scaled voltage signal or the cell voltage signal based on a voltage at the second power terminal 204. For example, the control circuit 208 may select the scaled voltage signal or the cell voltage signal using the comparator 302 as noted above. At block 710, the control circuit 208 outputs a high-impedance single-cell power signal including the selected one of the scaled voltage signal or the cell voltage signal. For example, the control circuit 208 may outputs the high-impedance signal with the power source selector 304 as noted above. At block 712, the signal buffer circuit 210 buffers the high-impedance single-cell power signal to generate a low-impedance single-cell power signal. At block 714, the low-impedance single-cell power signal sent to the voltage sense pin 104 of the single-cell power management integrated circuit 102 from the third power terminal 212.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system for supplying power from a multi-cell battery to a single-cell power management integrated circuit, the system comprising:
   a first power terminal for receiving a positive battery terminal voltage signal from the multi-cell battery;
   a second power terminal for receiving a cell voltage signal from the multi-cell battery;
   a voltage converter circuit configured to scale the positive battery terminal voltage signal to generate a scaled voltage signal;
   a control circuit configured to:
      detect whether the multi-cell battery is a regulated multi-cell battery or an unregulated multi-cell battery based on a voltage at the second power terminal,
      select one of the scaled voltage signal or the cell voltage signal based on the detection, and
      output a high-impedance single-cell power signal including the selected one of the scaled voltage signal or the cell voltage signal;
   a signal buffer circuit configured to buffer the high-impedance single-cell power signal to generate a low-impedance single-cell power signal; and
   a third power terminal for sending the low-impedance single-cell power signal to a voltage sense pin of the single-cell power management integrated circuit.

2. The system of claim 1, wherein the voltage converter circuit, the control circuit, and the signal buffer circuit are further configured to be enabled responsive to a device power control signal.

3. The system of claim 2, wherein the control circuit includes a delay timer configured to generate an on-switch control signal for the single-cell power management integrated circuit a predetermined period of time after the control circuit is enabled by the device power control signal.

4. The system of claim 2, wherein the system is further configured to receive the device power control signal from at least one selected from the group consisting of a rotary switch, a latched momentary button, and an external source.

5. The system of claim 1, wherein the control circuit includes:
   a comparator configured to select the one of the scaled voltage signal or the cell voltage signal by comparing the voltage at the second power terminal to a reference voltage, wherein the reference voltage is set based on a voltage level present at the second power terminal when the cell voltage signal is not applied, and
   a power source selector configured to output the selected one of the scaled voltage signal or the cell voltage signal by selectively coupling the voltage converter circuit or the second power terminal to the signal buffer circuit.

6. The system of claim 5, further comprising a signal conditioning circuit configured to scale the voltage at the second power terminal by a predetermined scaling factor before the comparator compares the voltage at the second power terminal to the reference voltage.

7. The system of claim 1, further comprising a power regulator circuit configured to generate a low-current, low-power supply signal for one or more always-on power domains in the single-cell power management integrated circuit from the positive battery terminal voltage signal of the multi-cell battery.

8. The system of claim 1, wherein the first power terminal is coupled to a B+ pin of the multi-cell battery, and wherein the second power terminal is coupled to a single wire pin of the multi-cell battery.

9. The system of claim 1, wherein the signal buffer circuit includes a voltage follower or an emitter follower.

10. The system of claim 1, wherein the voltage converter circuit includes a voltage divider, and wherein the signal buffer circuit includes an operational amplifier.

11. A method for supplying power from a multi-cell battery to a single-cell power management integrated circuit, the method comprising:
   receiving a positive battery terminal voltage signal from the multi-cell battery at a first power terminal;
   receiving a cell voltage signal from the multi-cell battery at a second power terminal;
   scaling the positive battery terminal voltage signal with a voltage converter circuit to generate a scaled voltage signal;

detecting, with a control circuit, whether the multi-cell battery is a regulated multi-cell battery or an unregulated multi-cell battery based on a voltage at the second power terminal;

selecting, with the control circuit, one of the scaled voltage signal or the cell voltage signal based on the detection;

outputting, with the control circuit, a high-impedance single-cell power signal including the selected one of the scaled voltage signal or the cell voltage signal;

buffering the high-impedance single-cell power signal with a signal buffer circuit to generate a low-impedance single-cell power signal; and sending the low-impedance single-cell power signal to a voltage sense pin of the single-cell power management integrated circuit from a third power terminal.

12. The method of claim 11, further comprising enabling the voltage converter circuit, the control circuit, and the signal buffer circuit responsive to a device power control signal.

13. The method of claim 12, further comprising generating, with a delay timer included in the control circuit, an on-switch control signal for the single-cell power management integrated circuit a predetermined period of time after the control circuit is enabled by the device power control signal.

14. The method of claim 12, further comprising receiving the device power control signal from at least one selected from the group consisting of a rotary switch, a latched momentary button, and an external source.

15. The method of claim 11, further comprising:

selecting the one of the scaled voltage signal or the cell voltage signal by comparing the voltage at the second power terminal to a reference voltage with a comparator included in the control circuit, wherein the reference voltage is set based on a voltage level present at the second power terminal when the cell voltage signal is not applied; and outputting the selected one of the scaled voltage signal or the cell voltage signal as the high-impedance single-cell power signal by selectively coupling the voltage converter circuit or the second power terminal to the signal buffer circuit with a power source selector included in the control circuit.

16. The method of claim 15, further comprising scaling the voltage at the second power terminal with a signal conditioning circuit prior to the comparator comparing the voltage at the second power terminal to the reference voltage.

17. The method of claim 11, further comprising generating a low-current, low-power supply signal with a power regulator circuit for one or more always-on power domains in the single-cell power management integrated circuit from the positive battery terminal voltage signal of the multi-cell battery.

18. The method of claim 11, further comprising:

receiving the positive battery terminal voltage signal at the first power terminal from a B+ pin of the multi-cell battery; and receiving the cell voltage signal at the second power terminal from a single wire pin of the multi-cell battery.

19. The method of claim 11, further comprising buffering the high-impedance single-cell power signal with a voltage follower or an emitter follower included in the signal buffer circuit to generate the low-impedance single-cell power signal.

20. The method of claim 11, further comprising:

scaling the positive battery terminal voltage signal with a voltage divider included in the voltage converter circuit to generate the scaled voltage signal; and buffering the high-impedance single-cell power signal with an operational amplifier included in the signal buffer circuit to generate the low-impedance single-cell power signal.

* * * * *